United States Patent [19]

Shaver et al.

[11] 4,279,702

[45] Jul. 21, 1981

[54] APPARATUS FOR MAKING HOLLOW CARBON MICROSPHERES

[75] Inventors: Robert G. Shaver, Alexandria; William R. Leake, Reston, both of Va.

[73] Assignee: Versar, Inc., Springfield, Va.

[21] Appl. No.: 110,874

[22] Filed: Jan. 10, 1980

Related U.S. Application Data

[62] Division of Ser. No. 10,867, Feb. 9, 1979, Pat. No. 4,229,425.

[51] Int. Cl.³ .............................................. C10B 1/06
[52] U.S. Cl. .................................................. 202/137
[58] Field of Search ............. 422/248; 156/DIG. 113, 156/613; 202/133-135, 137; 13/7; 23/314

[56] References Cited

U.S. PATENT DOCUMENTS 3,009,863 11/1961 Angevine ............................ 202/134
4,162,293 7/1979 Zevch .................................. 156/613

FOREIGN PATENT DOCUMENTS 8039234 10/1978 Japan ...................................... 422/248

Primary Examiner—Hiram Bernstein
Attorney, Agent, or Firm—Dowell & Dowell

[57] ABSTRACT

An apparatus for making hollow carbon microspheres starting with hollow microballoons made of a material which can by heating be degraded to a carbon structure having a shape similar to that of the original microballoon. The disclosure teaches specific batch treating steps and apparatus for optimizing the rate of production of the microspheres, while at the same time minimizing degradation, rupture and cracking of the resulting carbon product.

4 Claims, 2 Drawing Figures

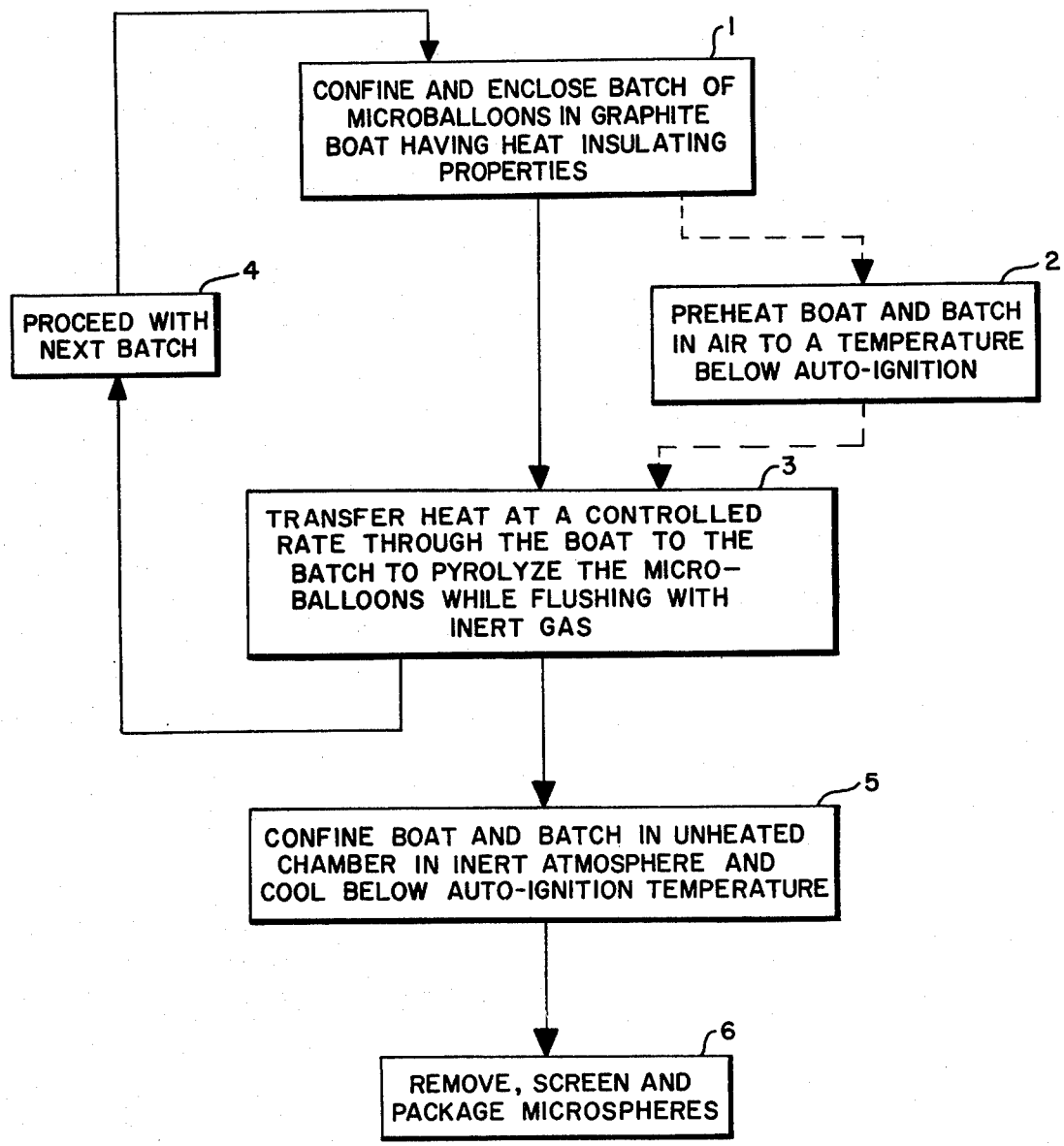

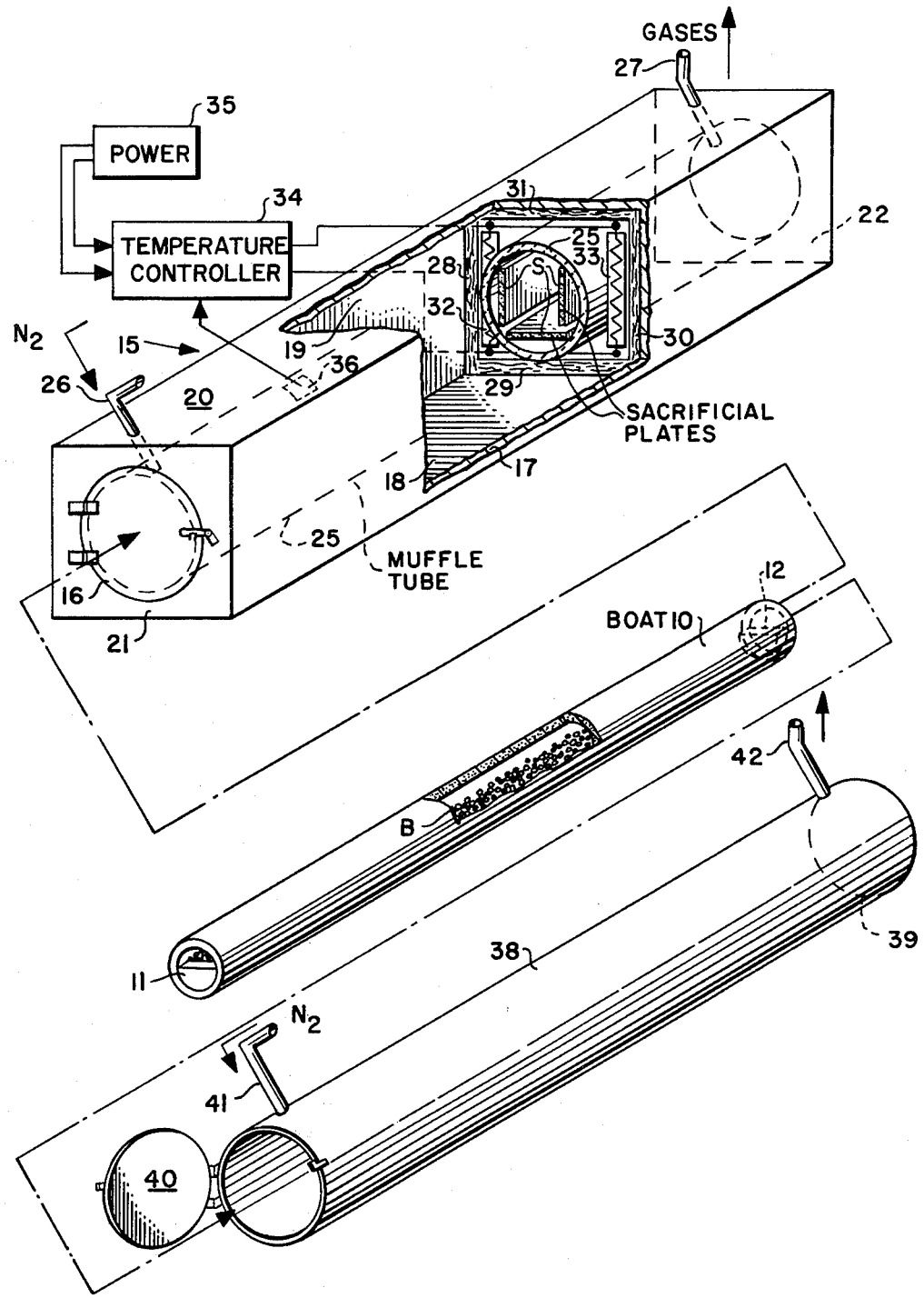

APPARATUS FOR MAKING HOLLOW CARBON MICROSPHERES

This is a division of our earlier copending application, Ser. No. 010,867, filed Feb. 9, 1979, now U.S. Pat. No. 4,229,425.

FIELD OF INVENTION

This invention relates to a pyrolytic apparatus for the batch manufacturing of hollow carbon microspheres from microballoons of heat degradable material which, after processing, leaves a structurally stable microsphere of carbon.

BACKGROUND AND PRIOR ART

The technique of making a formed carbon structure by preforming a similarly shaped structure of a material which can be heated and decomposed into carbon is well known.

For instance, U.S. Pat. No. 3,264,073 to Schmitt teaches such a process as an intermediate step using phenolic microballoons manufactured, perhaps, according to the process disclosed in U.S. Pat. No. 2,976,574 to Keutgen et al. Other microballoons usable as a starting material are manufactured from pitch according to processes of a type recited in U.S. Pat. No. 3,786,134 to Amagi et al.

In order to decompose the formed degradable material into carbon and recover the carbon structure intact, the heating and cooling steps of the process are controlled as to temperature, temperature gradient and time in an inert atmospheric environment. Since the heating step raises the temperature well above the auto-ignition temperature in air for carbon, some known processes use a cooling step which is also carried out in an inert atmosphere, as taught for example in U.S. Pat. Nos. 3,121,050 to Ford, and 2,461,365 to Bennett et al.

The prior art suggests a number of pyrolytically degradable materials for use as initial preformed microballoons, for instance polymers of alkyd or phenol resins or polyurethanes as suggested in Chemical Abstracts, Vol. 73, 1970, page 36, abstract 110,604q, or starting with an aromatic pitch as suggested in U.S. Pat. No. 3,786,134 (supra).

THE INVENTION

The present invention uses a process which is basically similar to the processes referred to in the above prior art, but the present process has been improved. Industrial use of carbon microspheres having diameters of the order of 5 to 150 microns has increased to the point where a substantial production rate is necessary to supply the demand. In order to avoid unnecessary lag time, a continuously heated oven is used in production, and this oven is lined with a muffle comprising an elongated quartz ceramic tube which is heated to raise its temperature to or above the carbonizing temperature of the preformed degradable microballoon material. The muffle tube glows and transfers the heat by radiation to a graphite boat which contains the degradable microballoons to be pyrolized. The muffle is heated from the outside in an oxygen atmosphere, but the inside of the muffle is flushed with an inert gas such as nitrogen so that the boat containing the degradable microballoons experiences a continuously changing inert atmosphere. Once the muffle is heated, it is necessary to keep it heated continuously, since it will crack if it is allowed to cool. Therefore, the microballoons must be fed into the muffle and removed therefrom as quickly as possible so that the muffle is not seriously cooled by opening it at one end. The dwell time in the muffle of the graphite boat containing the microballoons is dictated by the necessity of heating the microballoons slowly enough so that they do not simply burst as a result of rising internal gas pressure. The walls of the microballoons are microporous, and gases can diffuse therethrough if the temperature of the batch is raised at a slow enough rate. The boat not only limits the rate of heating of the microballoons, but also acts as a sacrificial material which is attacked by oxidizing gases and moisture given off as the microballoons are heated. The decomposition heating process takes about four hours, after which interval one end of the muffle is opened and the boat is removed and immediately placed in a second unheated chamber which is also provided with an inert atmosphere so that the microballoons and the boat are not oxidized before they can cool below the auto-ignition temperature of carbon microballoons in air. The second chamber also reduces the rate of heat loss through radiation so that the carbonized material cools at a rate which will prevent cracking or deterioration thereof. The carbon microspheres which result from decomposition of the microballoons are then recovered from the cooled boat, are screened in order to break up any agglomeration of the particles, and are then immediately packaged in airtight containers to keep them out of contact with moisture in the atmosphere. These microspheres are filled with nitrogen as a result of the above processing steps at the time when they are removed from the cooling chamber.

It is an important object of this invention to provide an efficient batch process apparatus for making hollow carbon microspheres from plastic microballoons wherein a sizable batch can be produced for each heating period in the oven chamber, and wherein the batches can be quickly and easily changed at the end of each heating interval without substantial cooling of the oven or time delay in changing over to a new batch to be carbonized. In an effort to provide a process of higher efficiency, the applicants have tried to use a continuous process wherein the degradable material microballoons are fed into one end of a heating zone, and continuously fed out the other end of the heating zone. However, such effort to speed up the process by shortening the heating period of the microballoons has resulted in a much lower yield of intact microspheres due to rupturing of the spherical form, cracking, oxidizing, etc.

Another important object of the invention is to provide apparatus in which each batch of degradable material microballoons is inserted into the hot oven inside a graphite boat which not only serves to confine the microballoons for handling, but which substantially encloses the microballoons except for a small opening at each end of the boat to permit flushing by the inert atmosphere as well as to permit escape of the volatile products of decomposition. The purpose of forming the boat in a nearly closed configuration is to provide a thermal barrier which substantially surrounds the batch of microballoons and serves as a thermal barrier so that the rate of temperature rise of the microballoons is slow enough to permit the diffusion of gases from within the microballoons outwardly through their micropores. Otherwise, the build up of gas pressure in a rapidly heated microballoon becomes sufficient to rupture it before the gas can escape through its micropores. In addition, the boat, being made of graphite, provides large sacrificial surfaces which can be attacked by gases and water vapor which would otherwise concentrate their attack upon the microballoons before they could be flushed from the muffle. In the process presently used, each boat holds about two pounds of microballoons, which results in a volume of approximately two gallons of finished microspheres.

The muffle is a fused quartz ceramic tube. In earlier processes a Mulltie (alumina-silica) tube was used, but the quartz ceramic tube is less subject to shock at high temperatures and therefore lasts longer in the oven before replacement is required. In addition, sacrificial graphite slabs are entered into the muffle to increase the life of the boat. The graphite boat can be made by assembling elongated slabs, but it preferably takes the form of a graphite tube of sufficient size to hold the batch of microballoons, while at the same time fitting inside the tubular muffle.

Another object is to provide apparatus for use with a process having an initial optional step of preheating the boat containing the plastic microballoons to a temperature below the decomposition temperature of the degradable material prior to inserting the boat and batch into the heating chamber so as to reduce the thermal shock to the muffle which results when placing a cold boat and batch therein.

Other objects and advantages of the invention will become apparent during the following discussion of the drawings.

THE DRAWINGS

FIG. 1 is a flow diagram showing a process useable with apparatus according to the present invention; and FIG. 2 is a perspective view partly in cross-section showing the apparatus for carrying out the above process.

Referring now to FIG. 1 this figure shows a flow diagram for the steps of the process. The step represented by Block 1 is the step of loading and confining a batch of polymer microballoons in a graphite boat which is substantially enclosed, except that sufficient opening is provided so that an inert atmosphere can be flushed through the boat, preferably entering one end and leaving the other end in order to flush away the gases formed by decomposition of the polymer while the boat and batch are heated within a first chamber, which comprises an oven.

The graphite boat containing the degradable microballoons is then inserted into the hot oven according to a step represented by Block 3 on the flow diagram of FIG. 1, and the boat and batch begin heating toward the decomposing temperature selected for the process. The oven is continuously maintained at a temperature of 2700° F. in the industrial process as it is presently practiced, although lower or higher temperatures, say in the range from 2000° to 3000° F., could be selected. The heating rate of the batch is limited by the construction of the graphite boat which serves as a thermal barrier through which heat can transfer only at a controlled rate. The structure of the graphite boat and the temperature of the oven are selected such that the microballoons are heated at as rapid a rate as possible while still allowing sufficient time that increasingly hot gases within the microballoons can diffuse through the microporous walls thereof without rupturing the microballoons. Limited by the present boat structure, it takes about four hours to raise the microballoons to the pyrolysis temperature. During this time, the boat and batch are flushed with an inert gas, nitrogen being selected for reasons of economy. In the process as presently practiced the boat and batch are heated inside of a first chamber comprising a quartz ceramic muffle tube which is about ten inches in diameter and slightly longer than the boat. The tube is heated by electric heaters located outside thereof, and is maintained hot continuously, since it would be uneconomic to keep reheating the oven for each batch and since the muffle cannot be cooled after it is once heated without cracking.

As an optional step, the pre-heating step represented by Block 2 in FIG. 1 can be used to heat the boat and batch in air to a temperature below its auto-ignition temperature prior to inserting it into the main muffle of the oven, whereby the total heating interval in the oven is reduced, and the thermal shock to the muffle tube itself is reduced.

At the end of about a four hour heating interval in Block 3, the boat and batch of carbon microballoons are removed from the muffle, and immediately confined within a second unheated chamber which is filled with an inert gas. At the same time, a newly prepared boat and batch of microballoons is inserted into the muffle, and the muffle is immediately reclosed to proceed with the heating and carbonizing process.

As shown in Block 5 of FIG. 1, the carbonized batch is allowed to remain in the unheated second chamber until it has cooled below the temperature at which auto-ignition would take place in air and then the boat and batch are removed.

As shown in Block 6 the cooled microspheres are then removed from the boat, are screened through a 150 micron mesh in order to break up any agglomeration, and the screened microspheres are then packaged in airtight containers to keep them out of contact with atmospheric moisture.

Thus, a batch is finished about every four hours, although the time can be slightly reduced if the preheat step of Block 2 is used.

FIG. 2 shows preferred apparatus for carrying out the process shown in FIG. 1. The drawing shows a boat 10 having both ends partially closed by plugs 11 and 12 so that the microballoons B will be retained inside the boat. The boat comprises a hollow tube of graphite of diameter suitable to contain a desired batch of microballoons B, in the present instance the boat confining about two pounds by weight. A small gap is provided between each of the plugs 11 and 12 and the wall of the boat 10 through which the gases which are produced incident to carbonizing can escape, and through which nitrogen can be flushed from outside of the boat 10. The boat need not be circular in cross-section, but can be rectangular or any other cross-section which is convenient to make. It happens that graphite tubing is commercially available at the present time for use in this application.

When a boat 10 is loaded with a batch of microballoons B, the boat is inserted into an oven 15 through a door 16 at one end of the oven. The oven is shown partly in cross-section in FIG. 2, and from this cross-section it can be seen that the oven comprises longitudinal walls 17, 18, 19 and 20, end walls 21 and 22, and a muffle tube 25 which is made of quartz ceramic and in the present instance is about ten inches in diameter. The tube 25 comprises the heated first chamber which extends substantially the full length of the furnace 15 and is closed at the end wall 22, but communicates through the end wall 21 at the door 16. Nitrogen gas is introduced at one end of the muffle 25 through a pipe 26, and the flushed gases are withdrawn from the muffle 25 at its other end through the pipe 27. The longitudinal walls and end walls are insulated thermally by suitable bats of insulation 28, 29, 30 and 31, etc., so as to reduce thermal losses from the oven. Electric heaters 32 and 33 are provided between the insulation and the muffle tube 25 to heat the latter. Only two such heaters are illustrated although it is understood that any number can be used as required. These electric heaters have their power controlled by a temperature controller 34 drawing power from a source 35 in order to keep the muffle 25 at the desired temperature as measured by a sensor 36. Glow-bars are used as the electric heaters, and these glow-bars comprise silicon carbide rods made by Norton Company and sold under the trademark "HOT ROD". These bars require an oxygen atmosphere, since they would be degraded unduly rapidly by a nitrogen atmosphere and this is one reason why the nitrogen gas is passed through the furnace inside of the muffle. Passing the gas inside of the muffle of course, also reduces the volume of gas required by the process. Inside the muffle there are additional sacrificial graphite plates S which are eventually destroyed by oxidizing agents and water vapor given off from each batch of microballoons B, the sacrificial plates S reducing the rate at which the boat 10 is eaten up by these gases.

As stated above in the portion of the specification relating to the process, the boat 10 containing the batch B is inserted in the furnace 15 for a length of time required to bring the microballoons fully up to carbonizing temperature which may be lower than the temperature set by the controller 34. After the required period of time, which is about four hours in the present manufacturing process where the oven is maintained at 2700° F., the boat 10 is immediately inserted into a second chamber 38 comprising an unheated tube which is closed by an end plate 39 at one end, and at the other end by a door 40 which is hinged to the chamber 38. The door 40 is then closed immediately and enough nitrogen is flushed through the chamber 38 to remove the oxygen atmosphere which enters when the door 40 is open, thereby to provide an inert atmosphere during cooling of the batch in the boat 10. The nitrogen is introduced through a pipe 41 and the flushed gases are discharged through the pipe 42. The chamber 38 remains closed at least until the temperature of the batch B and boat 10 falls below the auto-ignition temperature of carbon microballoons in air, at which time the door 40 may be opened and the boat 10 and batch B removed.

Moreover, as soon as a boat 10 and batch B are removed from the furnace 15 through the door 16, a new batch of microballoons in another boat will be introduced into the muffle 25 and the door 16 again closed for another four hour carbonizing interval.

The present invention is not to be limited to the exact illustrative embodiment and description presented for obviously changes can be made therein within the scope of the following claims.

We claim:

1. Apparatus for making hollow carbon microspheres from batches of hollow microballoons made of heat carbonizable material, the apparatus comprising:
   (a) an oven having a ceramic muffle tube therein, the oven surrounding and enclosing the muffle tube and having heating means between the oven and the tube for maintaining the tube at a temperature above the carbonizing temperature of said material, and the oven having a door providing access to the muffle tube;
   (b) means for flushing the muffle tube with an inert gas;
   (c) a graphite boat shaped to fit within the muffle tube and confine a batch of microballoons, the graphite boat being shaped to fully enclose said microballoons and thereby to provide a thermal barrier between the microballoons and the heated muffle tube, and the boat having small openings operative to permit flushing thereof with said inert gas and to permit the escape of volatile products of decomposition;
   (d) an unheated chamber outside the oven shaped to receive and enclose the boat during cooling; and
   (e) means for maintaining an inert gas atmosphere in said second chamber.

2. Apparatus as claimed in claim 1, wherein the graphite walls of the boat are of thicknesses operative to provide thermal insulating properties to slow the rate of heating and cooling of a batch within the boat and to prolong them over intervals of time sufficient to allow gases to diffuse through the walls of the microballoons without distorting and cracking the microballoons.

3. Apparatus as claimed in claim 2, wherein the graphite boat comprises a continuous elongated graphite tube with both ends partially closed by graphite plugs.

4. Apparatus as claimed in claim 1, wherein the muffle tube comprises a fused quartz tube, and wherein the heating means located outside the tube and within the oven is in atmospheric air.

* * * * *